(12) United States Patent
Stengele et al.

(10) Patent No.: US 7,325,666 B2
(45) Date of Patent: Feb. 5, 2008

(54) MANUFACTURING PLANT

(75) Inventors: Gerald Stengele, Ludwigsburg (DE); Jörg-Michael Nussbaum, Ludwigsburg (DE); Ioan-Mircea Corbean, Marbach (DE)

(73) Assignee: Cross Huller GmbH (DE)

( * ) Notice: Subject to any disclaimer, the term of this patent is extended or adjusted under 35 U.S.C. 154(b) by 0 days.

(21) Appl. No.: 11/402,341

(22) Filed: Apr. 12, 2006

(65) Prior Publication Data
US 2006/0230594 A1    Oct. 19, 2006

(30) Foreign Application Priority Data
Apr. 13, 2005    (EP)    ................ 05008033.2

(51) Int. Cl.
*B65G 37/00*    (2006.01)
(52) U.S. Cl. ................ 198/346.3; 198/346.2
(58) Field of Classification Search ............ 198/346.1, 198/346.2, 346.3, 345.1, 470.1, 478.1; 29/429, 29/430, 431; 414/564, 591
See application file for complete search history.

(56) References Cited

U.S. PATENT DOCUMENTS

| | | | |
|---|---|---|---|
| 3,307,720 A * | 3/1967 | Davis et al. ............ | 198/346.3 |
| 3,968,885 A * | 7/1976 | Hassan et al. ........... | 198/346.2 |
| 6,360,436 B1 * | 3/2002 | Takada .................... | 198/346.2 |
| 6,619,641 B2 | 9/2003 | Heitzmann et al. | |
| 6,641,128 B2 | 11/2003 | Fries | |
| 6,702,099 B2 * | 3/2004 | Otaguro et al. .......... | 198/468.6 |

FOREIGN PATENT DOCUMENTS

| | | |
|---|---|---|
| DE | 19756278 A1 | 7/1999 |
| DE | 199 20 291 A1 | 11/2000 |
| EP | 1 084 794 A1 | 3/2001 |
| EP | 1 260 304 B1 | 11/2002 |
| WO | WO 02/00388 A1 | 1/2002 |

* cited by examiner

*Primary Examiner*—James R Bidwell
(74) *Attorney, Agent, or Firm*—Reising, Ethington, Barnes, Kisselle, P.C.

(57) ABSTRACT

A manufacturing plant comprises at least one conveyor for conveying works and at least one processing machine. In front of a processing machine, provision is made for a delivery device which comprises a rotary table on which at least one pivoted work grab is disposed. A pivoting drive is disposed on the rotary table, acting of the work grab for pivoting the work grab between a downward position of delivery and removal and an upward conveying position.

5 Claims, 6 Drawing Sheets

MANUFACTURING PLANT

FIELD OF THE INVENTION

The invention relates to a manufacturing plant comprising at least one conveyor for conveying works in a conveying direction, a plurality of processing machines which are disposed on at least one side of the at least one conveyor, and a delivery device which is disposed in the at least one conveyor in front of a processing machine for delivery of a work from the conveyor to the processing machine and from the processing machine to the conveyor.

BACKGROUND OF THE INVENTION

Manufacturing plants of the generic type, which are also called production lines, are general practice and known for example from DE 197 56 278 A1 or WO 02/00388 A1 or EP 1 084 794 A1; they comprise several side-by-side processing machines which workpieces are supplied to, and withdrawn from, via a conveyor and a delivery device that serves as a loader. These known manufacturing plants are constructionally very complicated.

SUMMARY OF THE INVENTION

It is an object of the invention to simplify the design of the manufacturing plant of the generic type.

According to the invention, this object is attained by the conveyor being formed in a straight line and the delivery device comprising a rotary table, wherein the rotary table is rotarily drivable, wherein two work grabs are disposed on the rotary table, which oppose one another diametrically and which are pivoted about a horizontal pivoting axis, and wherein a pivoting drive is disposed on the rotary table, acting on the at least one work grab for pivoting the work grab between a downward position of delivery and removal and an upward conveying position. As a result of the configuration of the delivery device, works that are to be treated can easily be taken up by the conveyor and supplied to, or removed from, a processing machine and passed to another, opposite processing machine for further treatment or to the conveyor for further conveyance. In particular, parallel as well as sequential treatments can be carried out i.e., two different works can be subject to the same treatments on processing machines disposed opposite to each other; but it is also possible that one and the same workpiece is subject to various treatments successively on all the machines.

The further development, according to which the processing machines comprise a work skid which is displaceable crosswise of the conveying direction, wherein the at least one work grab is forked, and wherein the works are pushable into the at least one work grab, and pullable out of said work grab by the conveyor and the work skid, is especially favorable, because the conveying motion of the conveyor on the one hand and the displaceability of the tool skid of the processing machine on the other are used for delivery of the workpiece to the work grab or removal therefrom.

A manufacturing plant wherein work carriers for the works are provided, having lateral retaining elements, and wherein the forked work grabs have arms with grooves for accommodation of the retaining elements, reflects advantageous constructional details in this regard.

The possibilities of the invention can be exploited by special advantage when the further developments, according to which two diametrically opposed processing machines are provided on each delivery device and the work carriers comprise at least one guide rail which cooperates with the conveyor, are provided.

Further features, advantages and details of the invention will become apparent from the ensuing description of an exemplary embodiment, taken in conjunction with the drawing.

DESCRIPTION OF THE PREFERRED EMBODIMENT

Figure 1:
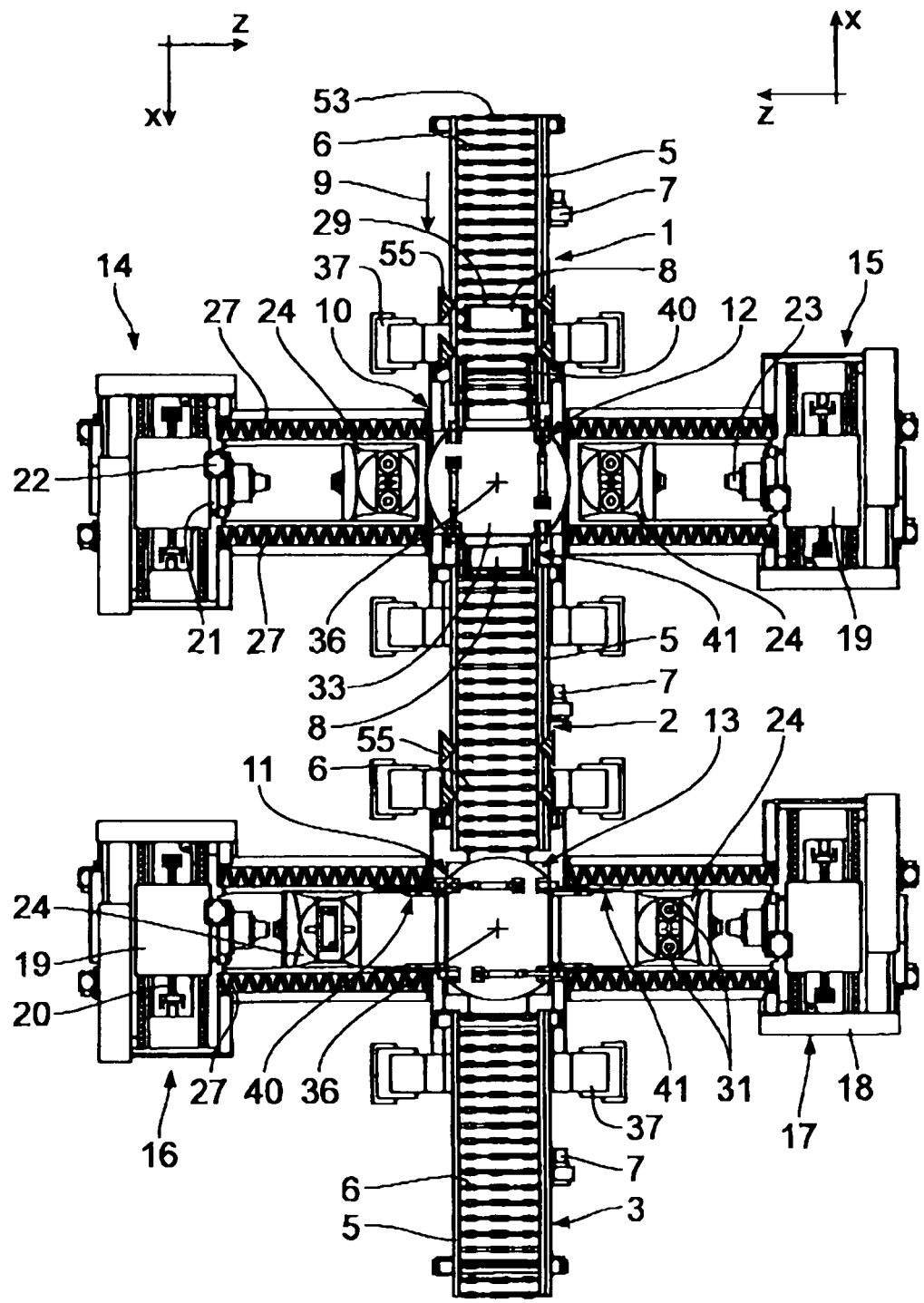
FIG. 1 is a plan view of a manufacturing plant according to the invention.
Figure 2:
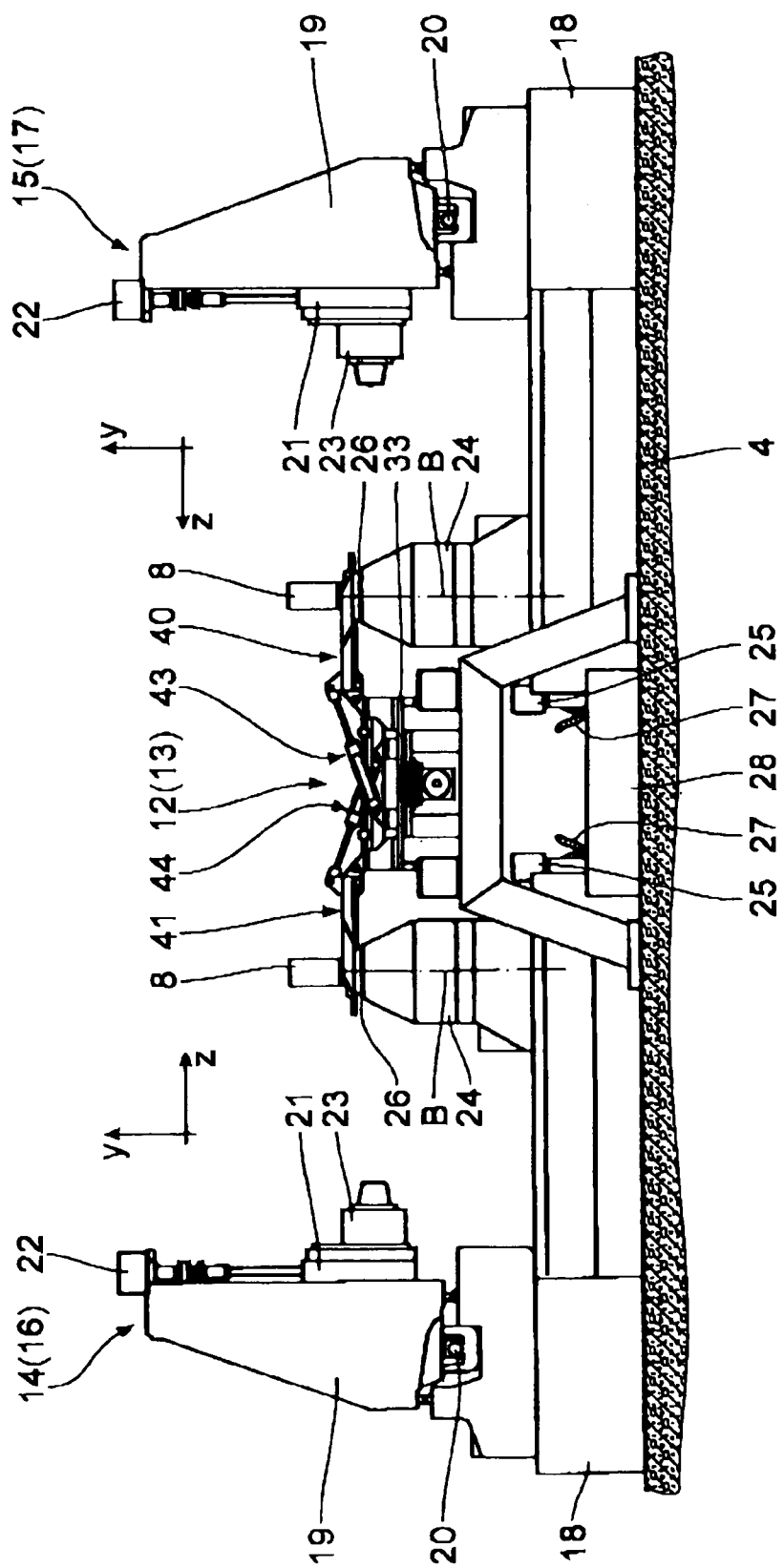
FIG. 2 is a side view of a delivery device of the manufacturing plant with work grabs in a downward pivoted position of delivery or removal.
Figure 3:
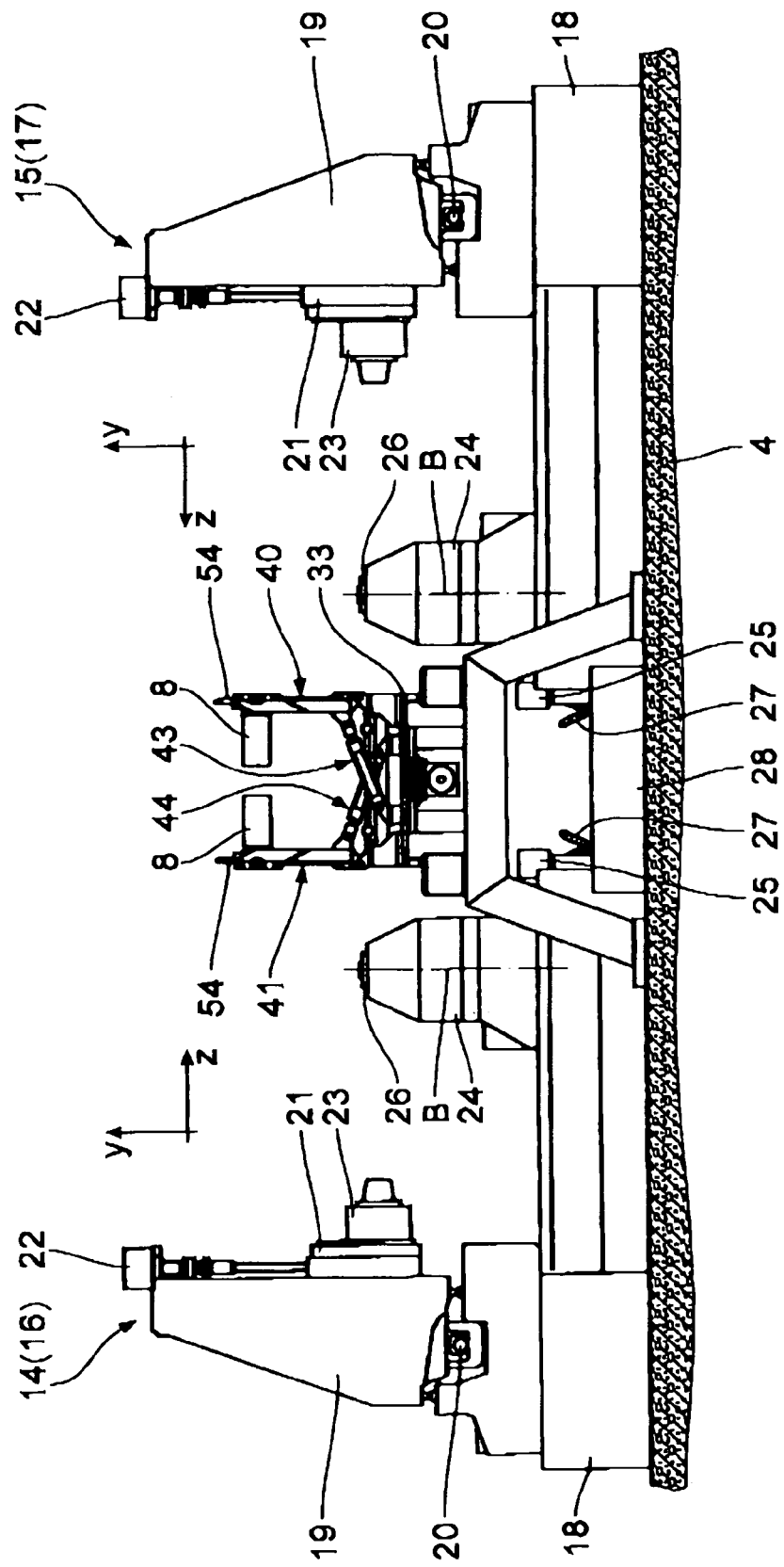
FIG. 3 is an illustration, corresponding to FIG. 2, with work grabs pivoted upwards.
Figure 4:
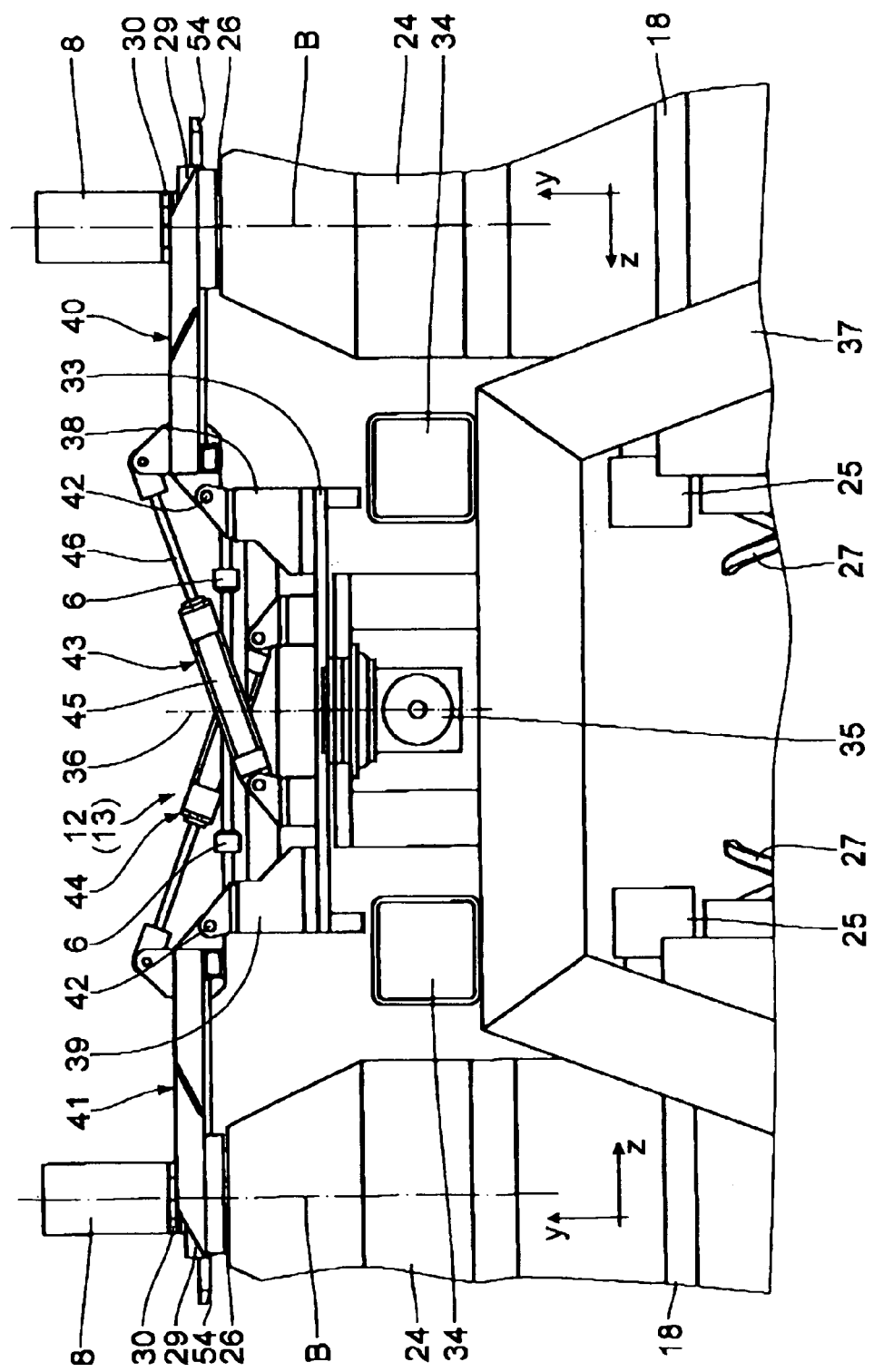
FIG. 4 is an illustration, on an enlarged scale, of a detail of FIG. 2.

The manufacturing plant, seen in the drawing, for mechanically treating workpieces comprises a row of conveyors 1, 2, 3. They have frames 5 which support themselves on the bottom 4 and on the upper side of which conveyor rollers 6 are disposed successively and rotatably. These conveyor rollers of each conveyor 1, 2, 3 are rotarily driven by a motor 7 so that works 8, which must be conveyed, can be conveyed in a conveying direction 9.

Delivery devices 12 and 13, respectively, are disposed in delivery positions 10, 11 between adjacent conveyors 1 and 2 and, respectively, 2 and 3. Processing machines 14, 15, 16, 17 are disposed in the delivery positions 10, 11 crosswise of the conveying direction 9. These machines 14 to 17 of identical design comprise a machine frame 18, on which an x-skid that runs in an x-direction that is parallel to the conveying direction 9 is supported for horizontal displacement by means of a ball-bearing spindle drive 20. The x-skid 19 carries a y-skid 21 which is vertically displaceable in a y-direction by means of a ball-bearing spindle drive 22. A rotarily drivable tool-holder spindle 23 is mounted on the y-skid 21; it extends perpendicularly to the x-direction and to the y-direction and crosswise of the conveying direction 9 in a z-direction towards the delivery device 12 and 13, respectively. Between the tool-holder spindle 23 and the respective delivery device 12 and 13, a work skid 24 is displaceable on the machine frame 18, moving between a position of machining in front of the tool-holder spindle 23 and the respective delivery position 10 and 11. In the present embodiment, the motions of the works 8 on the respective processing machine 14 to 17 in the z-direction (i.e. in the direction of the z-axis) are implemented by means of the work skid 24. Actuation of the work skid 24 in the z-direction also takes place by means of a ball-bearing spindle drive 25. Processing machines 14 to 17 of the species are known in practice.

Disposed on the work skid 24 is a work table 26 which is pivoted about a vertical B-axis that is parallel to the y-direction. By alternative, it can be pivoted about a horizontal A-axis as shown on FIG. 5 which is parallel to the x-direction and conveying direction 9.

Chip conveyors 27 in the form of spiral conveyors are mounted on both sides of the travel of the work skid 24, conveying chips to a central chip-conveying arrangement 28 that extends underneath the conveyors 1 to 3.

Adapter plates 29 in the form of rectangular plates, on which work seats 30 are formed, are provided as work carriers for conveying the works 8 and for clamping the works 8 on the respective work table 26. A workpiece 8 is chucked in a precisely defined position in the seat 30 on the adapter plate 29. Adapter plates of that type are fundamentally known from EP 1 260 304 B1 (corresponding to U.S. Pat. No. 6,619,641 B2). Clamping an adapter plate 29 and a workpiece chucked thereon takes place by so-called zero-point fixtures 31 which are disposed in the work table 26 and constructed in the way of a tool fixture. They seize and tighten a rear-recessed clamping bolt 32 which is mounted on the underside of the adapter plate 29, whereby the adapter plate 29 is fixed to the work table 26. Zero-point fixtures 31 of that type are known for example from DE 199 20 291 A1 and U.S. Pat. No. 6,641,128 B2.

The delivery devices 12, 13 each have a rotary table 33 which is mounted on a carrier frame 34 rotarily drivably about a vertical axis of rotation 36 by means of a motor 35. The carrier frame 34 supports itself on the bottom 4 by means of props 37.

Two bearing blocks 38, 39 are mounted on the rotary table 33, opposing each other diametrically; a work grab 40, 41 is accommodated in each of them pivotably about a horizontal axis 42. Each work grab 40 and 41 is pivotable by means of a pivoting drive 43, 44 between a horizontal position of delivery and removal and a vertical conveying position. The pivoting drives 43, 44 are hydraulically actuated piston-cylinder drives, the cylinders 45 of which are articulated to the rotary table 33, while the free end of the piston rod 46 is articulated to the respective grab 40 and 41. When the piston rod 46 is extracted, the grab 40 and 41 is in a horizontal position, whereas it is in a vertical position when the piston rod 46 is retracted into the cylinder 45.

The work grab 40 and 41, respectively, is forked i.e., it has two arms 47, 48 which are parallel to each other and perpendicular to the pivoting axis 42. The ends of the arms 47, 48 that are turned away from the pivoting axis 42 are not connected to each other.

On the inner surfaces 49, turned towards each other, of the arms 47, 48, provision is made for a groove 50, these grooves 50 also being parallel to each other. Positioning pins 52 are disposed as retaining elements on the work carrier on side walls 51 that are opposite to one another; the positioning pins 52 engage the respective grooves 50.

Figure 5:
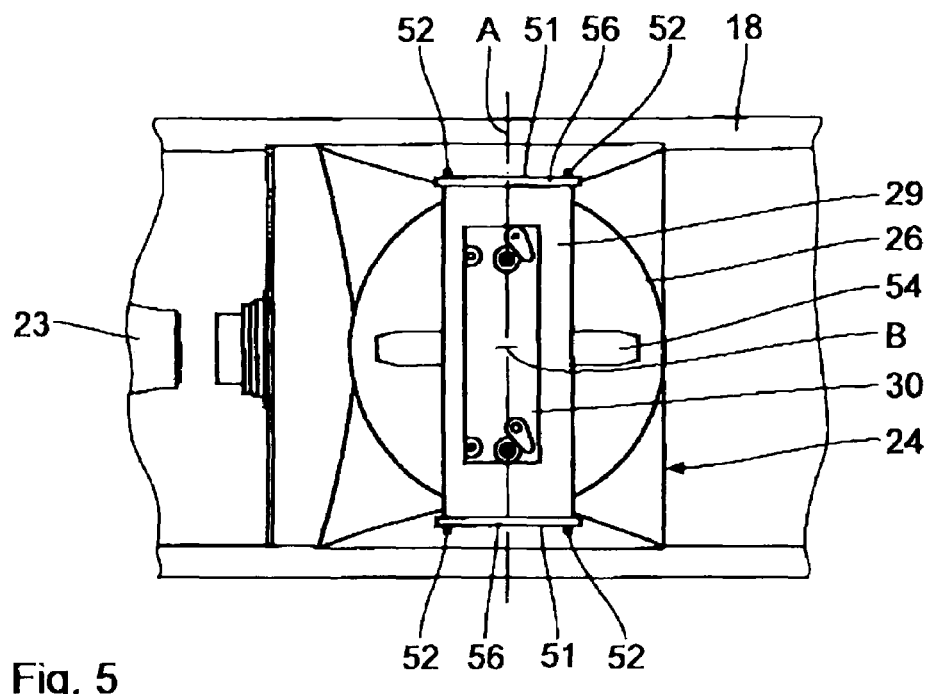
FIG. 5 is an illustration, on an enlarged scale, of a detail of FIG. 1, comprising a work skid with an adapter plate without workpiece in front of a tool-holder spindle.
Figure 6:
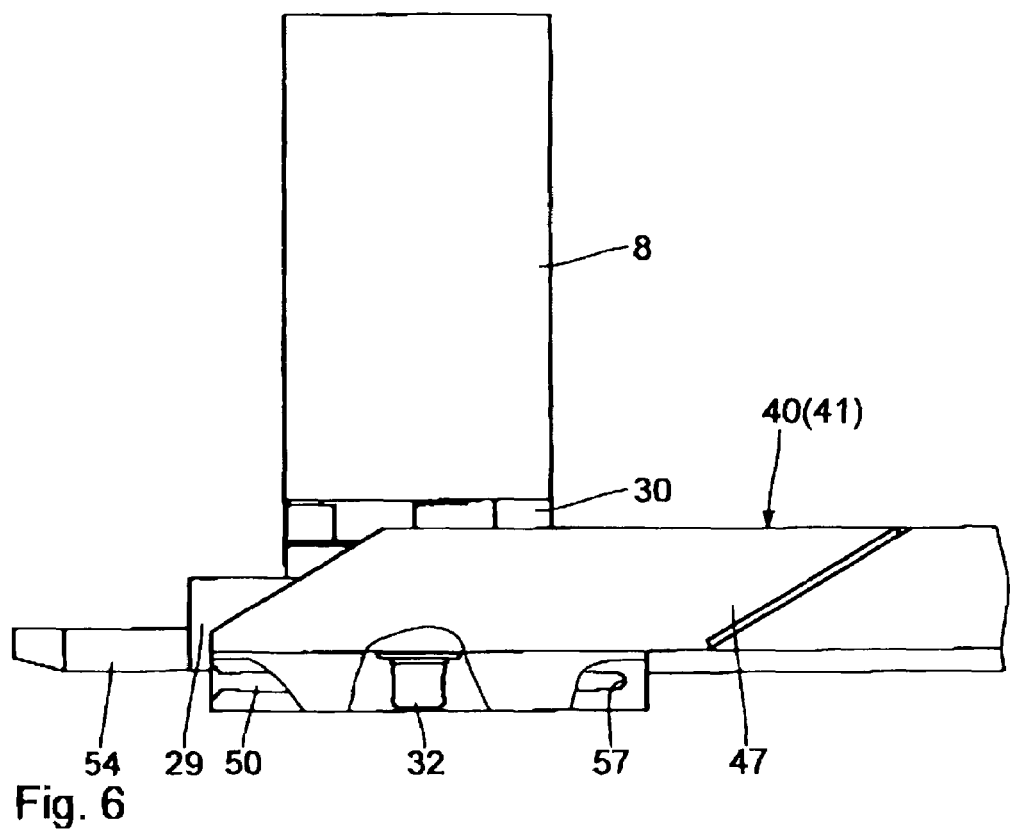
FIG. 6 is a side view, partially broken open, of details of a work grab with a workpiece.
Figure 7:
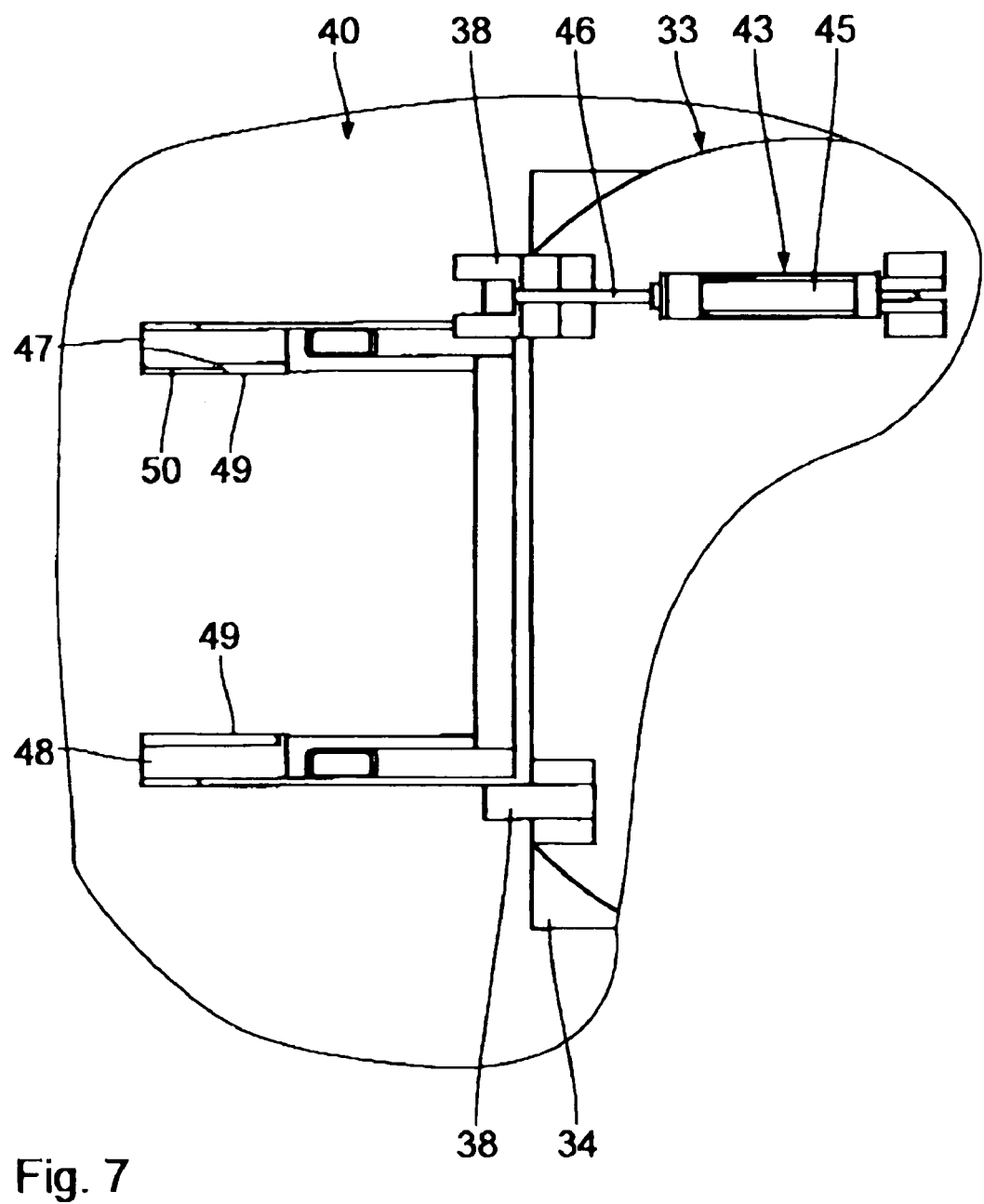
FIG. 7 is a plan view, partially broken open, of a work grab.

As seen in FIG. 1 in combination with FIGS. 5 and 6, the conveyor rollers 6 centrally comprise a guide roll 53. These guide rolls 53 cooperate with a central guide rail 54 which is mounted on the adapter plate 29, ensuring that the adapter plate 29 is conveyed centrically i.e., centered, upon conveyance on the conveyors 1, 2, 3. The guide rails 54, which run in the conveying direction 9, simultaneously ensure that an adapter plate 29 cannot tilt during conveyance and get wedged between two adjacent conveyor rollers 6, because the guide rail 54 covers the distance of several conveyor rollers 6.

Lateral stoppers 55 are located on the respective frame upstream of the delivery devices 12, 13 in the conveying direction 9; they cooperate with lateral guide rails 56 of the adapter plate 29, braking it in front of the respective delivery device 12 and 13. These lateral guide rails 56 also cooperate with the conveyor rollers 6, which is seen in FIG. 1.

The mode of operation is as follows:

In accordance with the plan view illustration in FIG. 1, a workpiece 8, which is clamped on the adapter plate 29 by means of the work seat 30, is conveyed on the conveyor 1 in the conveying direction 9 to the first delivery device 12 of the first delivery position 10. The rotary table 33 is pivoted in such a way that a grab 40 is in a horizontal position directly above the conveyor 1. The other grab 41 is located above the conveyor 2 which interconnects the delivery positions 10, 11.

The adapter plate 29, which approaches on the conveyor 1, is braked by the stoppers 55 and, oriented by the driven conveyor rollers 6, it is pushed between the arms 47, 48 of the work grab 40, with the positioning pins 52 arriving in the grooves 50. Insertion of the adapter plate 29 into the work grab 41 takes place substantially by means of the driven conveyor rollers 6. When the work grab 40 is pivoted by the pivoting drive 43 into the vertical, upward position, then the adapter plate 29 together with the work 8, owing to gravity, slides into a bottom stop position, which is defined by the end of the groove 50 and serves as a stop 57 for the positioning pin 52. This can only be a motion of one or very few millimeters. The other work grab 41 carries an adapter plate 29 with a machined workpiece 8 which is placed on the conveyor 2 and pulled out of the work grab 41 by the driven conveyor rollers 6 and conveyed to the second delivery device 13. By rotation of the rotary table 33 by 90°, the work 8, which is located in the upwards pivoted work grab 40, arrives above the work skid 24, for example, of the processing machine 15. Upon rotation of the rotary table 33, both work grabs 40 and 41 are always in their upwards pivoted position.

In direct vicinity to the first delivery device 12, the work skid 24 of this processing machine 15 already waits, down to which the work grab 40 with the adapter plate 29 is pivoted by corresponding actuation of the pivoting drive 43. In this case, the clamping bolts 32 of this adapter plate 29 move into the zero-point fixtures 31 which are then closed. The precise positioning of the adapter plate 29 in relation to the work grab 40 again ensures that the adapter plate 29 takes an accurate position in relation to the work skid 24. Then the work skid 24 of this processing machine 15 is moved in the z-direction to the tool-holder spindle 23 where customary machining of the work 8 takes place. Such a position of the work skid 24, loaded with a work 8, in front of the tool-holder spindle 23 is illustrated in FIG. 1 of the processing machine 16. FIG. 1 further shows the rotary table 33 of the second delivery device 13 in a position in which the two work grabs 40, 41 are turned towards the processing machines 16, 17, in which the work grabs 40 and 41 deposit works 8 that must be machined on the respective work skid 24 and, respectively, can take up from it machined works 8. They are consequently in a position of loading and removal. As opposed to this, the first delivery device 12 is in a position of pick-up and transfer, respectively.

The design according to the invention enables a work 8 to be machined only on one processing machine 14, 15, 16 or 17 and, correspondingly, two works 8 at a time to be transferred in the first delivery position 10 or second delivery position 11 from the conveyor 1 directly to the conveyor 2 or from the conveyor 2 directly to the conveyor 3. Likewise, a work 8 can be machined successively on all the four processing machines 14 to 17 by corresponding placement. Likewise, the works 8 can be machined successively only on the processing machines 14, 16 of one side or on the opposite processing machines 15, 17. Similarly, processing machines i.e., the processing machines 14, 16 or the processing machines 15, 17, can be disposed only on one side of the conveyors 1, 2, 3. The work run through the manufacturing plant regularly consists in that a processing machine 14 or 15 and 16 or 17, respectively, is loaded with a work 8 or unloaded, while the opposite processing machine 15 and 14 or 17 and 16 machines a work 8.

What is claimed is:

1. A manufacturing plant, comprising
    at least one conveyor for conveying works in a conveying direction;
    a plurality of processing machines which are disposed on at least one side of the at least one conveyor; and
    a delivery device which is disposed in the at least one conveyor in front of a processing machine for delivery of a work from the conveyor to the processing machine and from the processing machine to the conveyor;
    wherein the conveyor is formed in a straight line;
    wherein the delivery device comprises a rotary table;
    wherein the rotary table is rotarily drivable;
    wherein two work grabs are disposed on the rotary table, which oppose one another diametrically and which are pivoted about a horizontal pivoting axis; and
    wherein a pivoting drive is disposed on the rotary table, acting on the at least one work grab for pivoting the work grab between a downward position of delivery and removal and an upward conveying position.

2. A manufacturing plant according to claim 1,
    wherein the processing machines comprise a work skid which is displaceable crosswise of the conveying direction;
    wherein the at least one work grab is forked; and
    wherein the works are pushable into the at least one work grab, and pullable out of said work grab by the conveyor and the work skid.

3. A manufacturing plant according to claim 2,
    wherein work carriers for the works are provided, having lateral retaining elements; and
    wherein the forked work grabs have arms with grooves for accommodation of the retaining elements.

4. A manufacturing plant according to claim 1,
    wherein two diametrically opposed processing machines are provided on each delivery device.

5. A manufacturing plant according to claim 3,
    wherein the work carriers comprise at least one guide rail which cooperates with the conveyor.

* * * * *